(No Model.)
C. E. SWENEY.
CHECK ROWER CORN PLANTER.
No. 340,066. Patented Apr. 13, 1886.
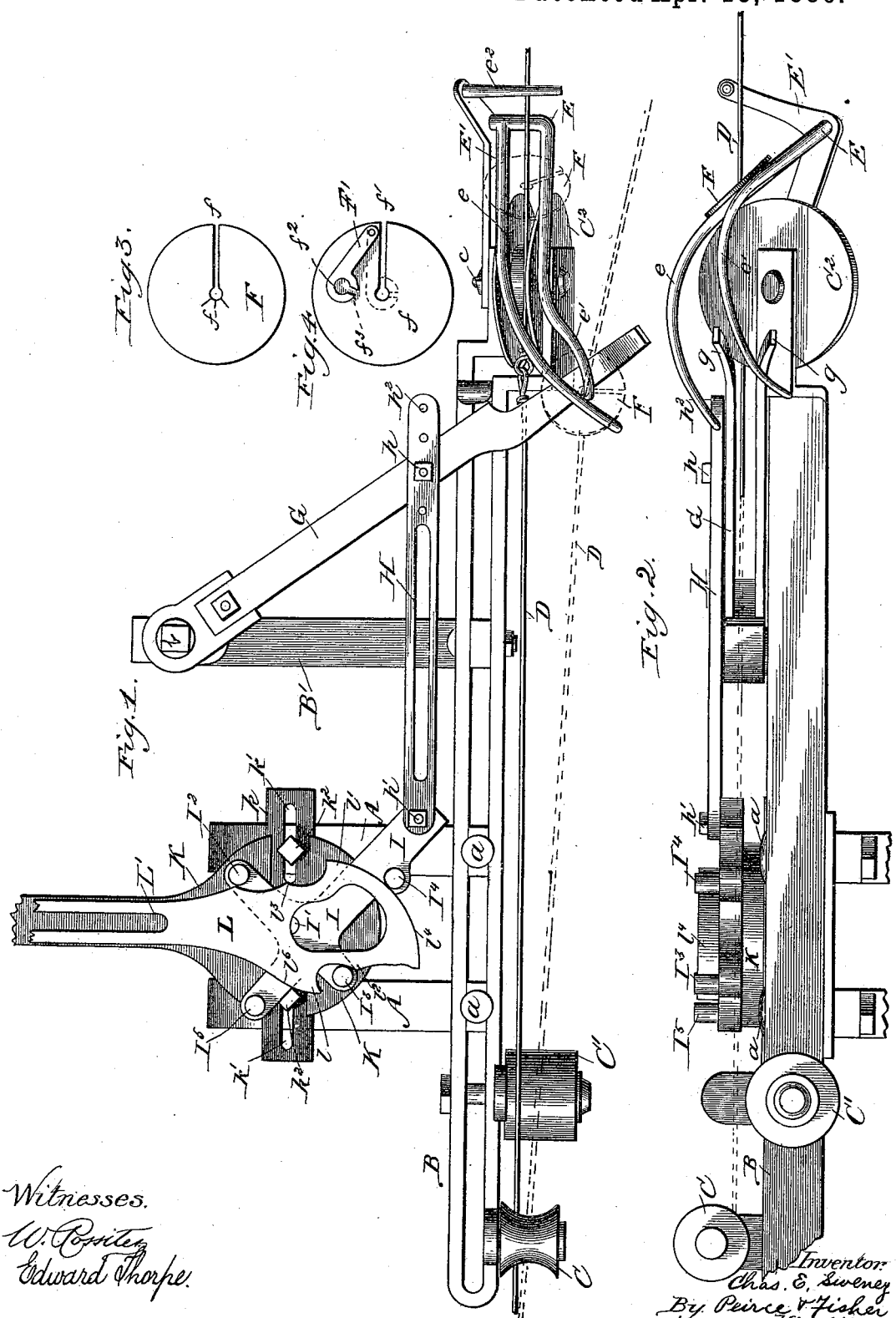

(No Model.) 2 Sheets—Sheet 2.
C. E. SWENEY.
CHECK ROWER CORN PLANTER.
No. 340,066. Patented Apr. 13, 1886.
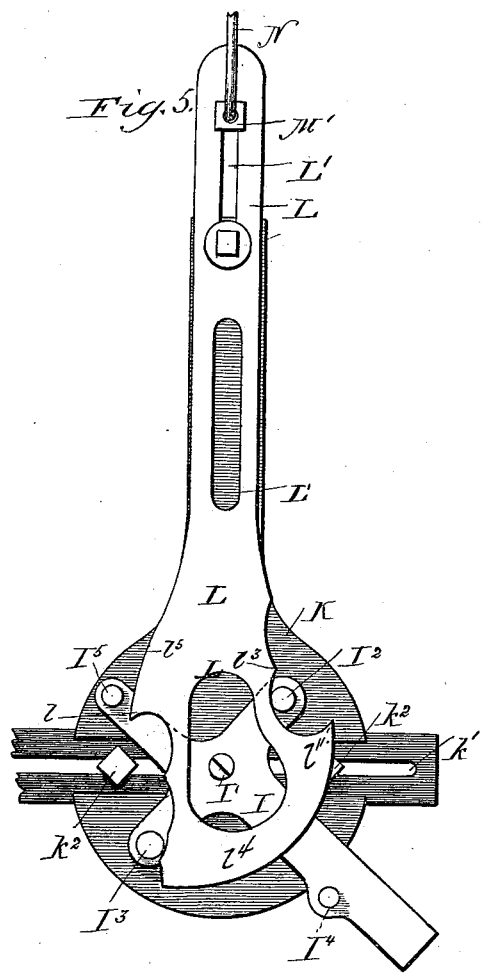
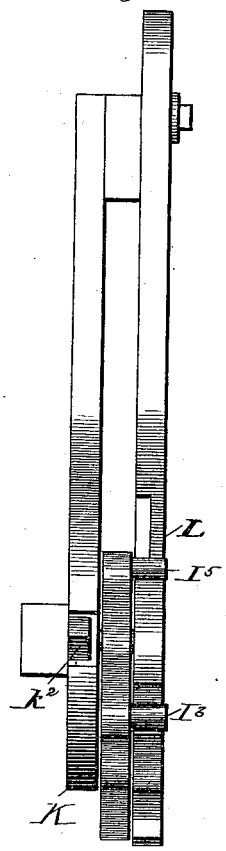
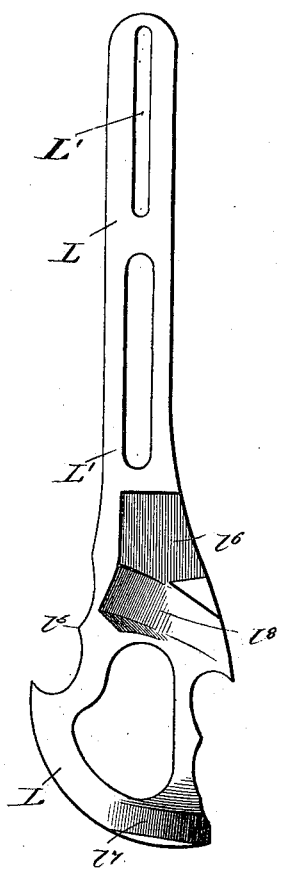
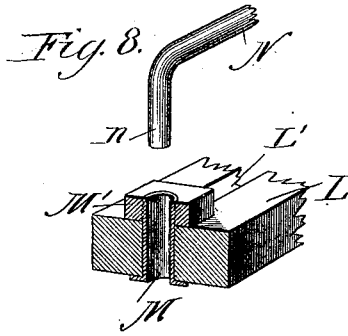
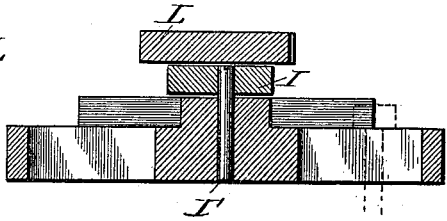
Witnesses.
W. Rossiter
Edward Thorpe.
Inventor.
Chas. E. Sweney
By Peirce & Fisher
His Attys.

UNITED STATES PATENT OFFICE.

CHARLES E. SWENEY, OF PIERCETON, INDIANA.

CHECK-ROWER CORN-PLANTER.

SPECIFICATION forming part of Letters Patent No. 340,066, dated April 13, 1886.

Application filed December 14, 1885. Serial No. 185,652. (No model.)

*To all whom it may concern:*

Be it known that I, CHARLES E. SWENEY, a citizen of the United States, residing at Pierceton, Indiana, have made certain new and useful Improvements in Check-Rower Corn-Planters, of which I do declare the following to be a full, clear, and exact description, reference being had to the accompanying drawings, forming part of this specification.

Prior to my present invention it has been proposed, in the manufacture of check-rower corn-planters, to provide the knotted check-row line near its end with a large ball affixed thereon, and instead of the usual supports for the check-row line to provide supports of a special and peculiar construction adapted to co-operate with the ball, in order to automatically throw the line from the machine at the end of the planted rows.

In Letters Patent No. 318,931, granted to me May 26, 1885, there is described improved mechanism whereby the check-row line may be automatically detached from the planter when the latter has completed its traverse of the field and is about to recross the same to plant the next succeeding row of grain. Such improved mechanism consisted, essentially, of a line-holder adapted to detachably retain the check-row line or wire in such manner that when the planter reached the end of the row the line or wire would be automatically released from its anchor and permitted to fall from the machine.

One of the objects of my present invention is to furnish improved means for automatically throwing or releasing the check-row line from the planter; and to this end the invention consists, first, in providing the check-row line or wire with a disk or plate adapted to co-operate with a suitable guide on the machine in order to throw the line therefrom.

In this connection my invention consists in the combination, with suitable supports for the check-row line or wire, of a separate guide adapted to co-operate with a suitable throw-off stop on the check-row line and to automatically throw said line from the machine.

My invention also consists in the construction of throw-off stop and guide mechanism, hereinafter more specifically referred to.

In an application for Letters Patent for improvements in check-rower corn-planters, filed by me in the Patent Office on the 16th day of July, 1885, and bearing Serial No. 171,727, I have described and claimed a certain novel construction of mechanism for communicating motion from the usual trip-lever to the rocking lever that operates the seed-slides of the seed-boxes.

My present invention has for its further object to simplify and otherwise improve the mechanism there shown, and to this end consists in the combination, with a suitable trip-lever for the knotted wire, of an oscillating lever in connection therewith and provided with studs, and a slide-bar suitably connected with the mechanism that operates the seed-slides and provided with stops adapted to engage with the studs on the oscillating lever.

A further object of my invention is to provide means for guarding the seed-slides against accidental movement during the operation of planting, and to this end consists in the combination, with the usual trip-lever, of an oscillating lever in suitable connection therewith and provided with studs, and a slide-bar adapted to receive movement from the oscillating lever and communicate the same to the seed-slides, and provided with friction-shoulders adapted to coact with the stops of the oscillating lever, and thus guard against accidental movement of the seed-slides.

A further object of my invention is to provide improved means whereby the mechanism that operates the seed-slides can be brought into more perfect alignment with the usual rocking lever that operates these slides, and to this end consists in mounting the oscillating lever and slide-bar, which receive motion from the trip-lever and communicate the same to the rocking lever, upon an adjustable base-plate.

My invention finally consists in certain novel details of construction hereinafter described, illustrated in the accompanying drawings, and particularly defined in the claims at the end of this specification.

I have illustrated in the drawings so much only of a check-rower as is necessary to a complete understanding of my invention, and the skilled mechanic will readily understand how the parts shown are to be employed in machines of the type shown in my before-mentioned application, or in connection with other well-known constructions of corn-planters.

Figure 1 is a plan view of a portion of a check-rower corn-planter embodying my invention. Fig. 2 is a view of the same in side elevation. Fig. 3 is a view of my improved throw-off plate for the check-row line. Fig. 4 is a plan view of a modified form of throw-off plate. Fig. 5 is a plan view of the oscillating lever and the slide-bar mounted upon an adjustable base-plate and in adjustable connection with the rod that communicates movement from the slide-bar to the rocking-lever of the seed-slide. Fig. 6 is a view in side elevation of the oscillating lever, the slide-bar, and the adjustable base-plate. Fig. 7 is a plan view of the under side of the slide-bar. Fig. 8 is a view, partly in perspective and partly in section, showing the means of adjustably attaching the slide-bar to the rod that extends to the rocking bar of the seed slide. Fig. 9 is a view in vertical section.

A designates suitable brackets adapted to be connected in the usual manner to the sides of the corn-planter, and upon these brackets are adjustably held, by means of bolts $a$, the frame B, which serves to sustain the supports and guides for the check-row wire. These supports may be of any suitable construction; but in the drawings I have shown them as consisting of the pulleys C C' at one end, and the main pulley $C^2$ at the opposite end, this last-mentioned pulley being journaled between the bent ends of the bars that constitute the supporting-frame.

In order to throw the check-row wire D from its supporting-pulleys and from the trip-lever, I provide at the front end of the supporting-frame the guide E, which consists, preferably, of the bent arms $e$ and $e'$, these arms being arranged, preferably, as shown in the drawings, so as to extend over and to one side of the pulley $C^2$. This guide E is connected or formed in piece with a plate, E', which is separate from the main supporting-frame B, but is held thereon by means of the bolt $c$, on which is journaled the pulley $C^2$. It will be readily understood, however, that any other suitable means may be employed for attaching this separate guide in suitable position with respect to the supporting-pulley of the check-row line. A guard-pin, $e^2$, may be formed on this plate E', if desired.

Upon the check-row wire D, at a short distance from the end of the field and at a suitable point for throwing the check-rower out of action at the proper time, is placed the throw-off plate F. This plate, as shown in Fig. 3, consists of a thin metal disk having from its periphery to its center the slot or opening $f$ narrower than the diameter of the check-row line, and having the central opening, $f'$, of a size considerably larger than the diameter of such wire. This plate is inserted upon the wire by laterally separating the edges of the slot a sufficient distance to permit the wire to pass through the same to the central opening, after which the edges of the disk will be brought to the same plane, and the disk will be thus guarded against displacement from the wire. The size of the opening $f'$ is such that the disk can turn and oscillate freely upon the wire, and can slide thereon until its movement is arrested by one of the knots of the wire.

From the foregoing construction it will be seen that when the planter has traversed the field and reached the end of the planted row, the disk F will ride upward upon the guide E, as seen in Fig. 2, and, as the machine continues to move forward, will lift the check-row wire out of the pulley $C^2$, and the bent ends of the guide-arms will draw the wire from out the forked lever and from off the supporting-pulleys C and C'.

It will be readily understood that the precise construction and arrangement of the guide E may be modified, without departing from the spirit of my invention, in such manner as to enable it to co-operate with the disk F in throwing the check-row wire off the various forms of supports commonly employed in check-rowers, and this guide may be continued backward any desired distance to cause the proper release of the wire from its supports. A decided advantage is attained by forming this guide separate from the usual supporting mechanism of the check-row line, as by so doing I am enabled to apply a throw-off device to the existing forms of check-rower corn-planter. By forming the opening $f'$ of the disk F of greater diameter than the check-row wire, this disk is permitted to freely oscillate upon the wire, and hence ride with greater ease upon the throw-off guide and avoid all danger of breakage.

To the supporting-frame B is bolted the arm B', upon the inner end of which is journaled, as at $b$, the trip-lever G, the outer portion of which is provided with the forks $g$ of suitable construction. To this trip-lever is pivotally attached by the bolt $h$ the connecting-bar H, the opposite end of this bar being united by the bolt $h'$ to the end of the oscillating lever I, and in this bar H are formed a series of holes, $h^2$, which enable the bar to be adjustably connected with the trip-lever for a purpose to be presently explained. The oscillating lever I is journaled upon the pin I', rising from the base-plate K, that is formed with the depressed portion $k$, having the slots $k'$ therein, through which pass the bolts $k^2$, that serve to adjustably connect the base-plate to the brackets A.

From the upper face of the oscillating lever I extend the studs $I^2$ and $I^3$, and between these studs and upon the face of the lever rests the slide-bar L, the opposite edges of which are provided with the stops or projections $l$ and $l'$, adapted to co-operate with the studs $I^2$ and $I^3$, as will presently more fully appear.

In the rear portion of the slide-bar L is formed the long slot L', in which, as shown in Fig. 8, is loosely fitted the flanged sleeve M, having its upper end threaded to receive the jam-nut M', by which the sleeve may be clamped at any desired position in the slot. The purpose of this sleeve M is to receive the bent end $n$ of the rod N, which serves to connect the slide-bar L with the usual rocking lever that operates the seed-slides. By thus adjustably connecting the rod N to the slide-bar, I am enabled to use rods of a uniform length for the different varieties of corn-planters to which my check-rower may be attached, as the distance from the side of the seed-box to the rocking lever will vary in different machines. The edges of the slide-bar L are cut away, as shown, and are provided, respectively, with the friction-shoulders $l^2$ and $l^3$, that co-operate with the studs $I^2$ and $I^3$ of the oscillating lever, as will appear from the operation of the parts hereinafter defined, and the edges of this bar are curved, as at $l^4$ and $l^5$, to coact with the guide-pins $I^4$ and $I^5$, that rise from the upper face of the oscillating lever. The under side of the slide-bar L is provided with the recess $l^6$, and with the inclined or cam-faced depressions $l^7$ and $l^8$, in which move, respectively, the guide-pins $I^4$ and $I^5$ of the lever I.

From the foregoing description the operation of the parts will be seen to be as follows: The base-plate K, being placed upon the brackets A, is adjusted into perfect alignment with the rocking-lever (not shown) that operates the seed-slides, so as to insure entire accuracy and ease of movement of the parts, and at the same time the connecting-bar H will, by means of the bolt $h$ and holes $h^2$, be so united to the trip-lever as to enable this lever to properly co-operate with the oscillating lever and the mechanism that works the seed-slides. Assuming now the parts to be in the relative position shown in Fig. 7 and the machine to be moving forward, the knots of the check-row wire will engage with the end of the trip-lever in the usual manner and will force this lever backward. In its backward movement the trip-lever, through the medium of the connecting-bar H, oscillates the lever I, causing the stud $I^3$ of this lever to engage with the stop $l$ of the slide-bar L, and thus force this bar backward and cause it to operate the rocking-bar that moves the seed-slides.

During the first part of this backward movement of the trip-lever the guide-pin $I^4$ will bear against the curved edge $l^4$ of the slide-bar and retain the stop $l$ in proper engagement with the stud $I^3$, and toward the end of this movement the guide-pin $I^5$ will pass into the recess $l^6$ on the under side of the slide-bar. When the trip-lever has completed its backward movement the knot of the check-row wire will slip from its end and the lever will be drawn forward by the usual retracting-spring into position to engage with the succeeding knots of the wire. As the trip-lever is thus moved forward, the guide-pin $I^5$ will enter the recess $l^8$ of the slide-bar and ride along the cam-face thereof until it passes from beneath the stop or projection $l$ of the slide-bar, the slide-bar still remaining in its extreme backward position and the several parts being relatively disposed, as seen in Fig. 5. As the trip-lever is again caught by a knot of the wire and moved backward, the stud $I^2$ engages with the stop $l'$ of the slide-bar and moves this bar forward to its first position, causing it in turn to retract the rocking lever that operates the seed-slides. During this forward movement of the slide-bar (as the trip-lever is moved backward) the guide-pin $I^5$ bears against the curved edge $l^5$ of the bar and holds it in engagement with the stud $I^2$. As the traction-spring again retracts the trip-lever, after the knot of the wire has passed therefrom, the guide-pin $I^4$ enters the recess or depression $l^7$ on the under side of the slide-bar and rides along the cam-face thereof until it passes the curved edge $l^4$ of this bar, leaving the parts again in the relative position shown in Fig. 1, in readiness to effect another backward movement of the slide-bar.

It will be observed by reference to Fig. 1 of the drawings that when the slide-bar is in its extreme forward position the friction-shoulder $l^2$ will bear against the stud $I^3$ and the slide bar, and consequently the seed-slides will thus be guarded against accidental movement, since, in order to overcome the "friction-lock" thus created, it will be necessary to exert sufficient strain upon the slide-bar to slightly move backward the trip-lever against the force of its traction-spring. So, also, it will be seen that when the slide-bar is in its extreme backward position the friction-shoulder $l^3$ and stud $I^2$ will co-operate to produce a like friction lock of the slide-bar. This manner of locking the slide-bar I regard as of importance, since it avoids all danger of irregular dropping or loss of grain by accidental movement of the seed-slides that might otherwise be caused by the jolting of the machine over rough ground.

In Fig. 4 of the drawings the disk for the check-row wire is shown as provided with a supplemental latch, F', pivoted thereto, and provided at its end with an opening, $f^2$, adapted to be brought concentric with the central opening of the disk and with a slot, $f^3$, of substantially the diameter of the wire. This modified form of disk will be placed upon the wires in the same manner as the disk heretofore described, (except that the slot of this disk is of a size to admit the wire without bending the disk,) after which the supplemental latch F' will be swung to permit it to slip over the wire.

It will be readily understood that the details of construction above set out may be varied without departing from the spirit of my invention, and to such details, therefore, I do not wish the invention to be understood as restricted.

I am aware that it has heretofore been proposed to provide the check-row wire with a large ball for throwing said wire off the pulleys, and to construct the main body of the pulley-supports, in such manner as to act as a releasing guide. I do not, therefore, design to cover such construction in the following claims.

Having thus described my invention, what I claim as new, and desire to secure by Letters Patent, is—

1. In a check-rower corn-planter, the combination, with suitable supports for the check-row wire, of a wire provided with a disk or plate mounted thereon and suitable guides for engaging with said disk or plate to throw the wire from the machine, substantially as described.

2. A check-row wire for corn-planters, having suitable knots or stops at intervals throughout its length, and having a disk or plate loosely mounted thereon, substantially as described.

3. A check-row wire for corn-planters, having suitable knots or stops at intervals throughout its length, and having a slotted disk or plate mounted thereon, substantially as described.

4. In a check-rower, the combination, with suitable supports for the check-row wire, of a wire provided with a suitable throw-off device and a suitable guide for engaging with said throw-off device, said guide being formed separate from the usual wire-supports and adapted to be attached to the machine, substantially as described.

5. In a check-rower, the combination, with suitable supports for the check-row wire and a wire provided with a suitable throw-off device, of a guide for said throw-off device, comprising curved guide-arms, substantially as described.

6. In a check-row corn-planter, the combination, with a suitable trip-lever for the knotted wire, of an oscillating lever connected with the trip-lever and provided with studs and a slide-bar in suitable connection with the mechanism that operates the seed-slides, and having stops to engage with the studs on the oscillating lever, substantially as described.

7. In a check-rower corn-planter, the combination, with a suitable trip-lever for the knotted wire, of the oscillating lever provided with the studs, and the slide-bar, provided upon its opposite edges with the stops, and said slide-bar being in suitable connection with the mechanism that operates the seed-slides, substantially as described.

8. In a check-rower corn-planter, the combination, with a suitable trip-lever for the knotted wire, of an oscillating lever connected with the trip-lever and provided with studs and guide-pins, and a slide-bar in suitable connection with the mechanism that operates the seed-slides, and having stops to engage with the studs on the oscillating bar, and having cam-faces to coact with the guide-pins on said bar, substantially as described.

9. In a check-rower corn-planter, the combination, with a suitable trip-lever for the knotted wire, of the oscillating lever I, provided with studs $I^2$ and $I^3$, and with guide-pins, and the slide-bar L, having upon its opposite edges stops and friction-shoulders to engage with said studs and guide-pins, and having upon its under side cam-recesses to coact with the friction-pins, substantially as described.

10. In a check-rower corn-planter, the combination, with a suitable trip-lever for the knotted wire, of an oscillating lever connected with the trip-lever and provided with studs and with guide-pins, and a slide-bar in suitable connection with the mechanism that operates the seed-slides, and having stops to engage with the studs, and having friction-shoulders to engage with the guide-pins of the oscillating lever, substantially as described.

11. In a check-rower corn-planter, the combination, with a suitable trip-lever for the mounted wire, of an oscillating lever adjustably connected with the trip-lever, a slide-bar for operating the seed-slides, and an adjustable base-plate for sustaining said oscillating lever and slide-bars, substantially as described.

12. In a check-rower corn-planter, the combination, with a suitable trip-lever for the knotted wire, of an oscillating lever connected with the trip-lever, and a slide-bar co-operating with said oscillating lever adjustably connected with the rod that communicates motion to the seed-slide, substantially as described.

CHARLES E. SWENEY.

Witnesses:
SANFORD H. HARRIS,
DANIEL W. PHILLIPS.